United States Patent
Coon et al.

(10) Patent No.: US 11,012,231 B2
(45) Date of Patent: *May 18, 2021

(54) AUTHENTICATED COPYING OF ENCRYPTION KEYS BETWEEN SECURE ZONES

(71) Applicant: International Business Machines Corporation, Armonk, NY (US)

(72) Inventors: James R. Coon, Rochester, MN (US); Michael J. Miele, Concord, NC (US); Garry J. Sullivan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,279

(22) Filed: Feb. 6, 2020

(65) Prior Publication Data
US 2020/0177374 A1 Jun. 4, 2020

Related U.S. Application Data

(63) Continuation of application No. 15/355,162, filed on Nov. 18, 2016, now Pat. No. 10,594,478.

(51) Int. Cl.
*H04L 9/08* (2006.01)
*H04L 29/06* (2006.01)

(52) U.S. Cl.
CPC ........ *H04L 9/0822* (2013.01); *H04L 63/0428* (2013.01); *H04L 63/06* (2013.01); *H04L 63/08* (2013.01); *H04L 63/105* (2013.01); *H04L 2209/12* (2013.01); *H04L 2463/062* (2013.01)

(58) Field of Classification Search
CPC . H04L 9/32; H04L 9/14; H04L 9/0822; H04L 63/0428; H04L 63/08
See application file for complete search history.

(56) References Cited

U.S. PATENT DOCUMENTS

| | | | |
|---|---|---|---|
| 5,825,875 A | 10/1998 | Ugon | |
| 6,031,910 A | 2/2000 | Deindl | |
| 6,230,267 B1 | 5/2001 | Richards | |
| 6,351,817 B1 | 2/2002 | Flyntz | |
| 7,065,648 B1 | 6/2006 | Kamibayashi | |
| 8,516,366 B2* | 8/2013 | Hicks | G06F 16/958 715/255 |
| 9,541,905 B2* | 1/2017 | Nixon | H04L 67/12 |
| 9,819,672 B1 | 11/2017 | Machani | |
| 2003/0130960 A1 | 7/2003 | Fraser | |
| 2006/0230437 A1 | 10/2006 | Boyer | |

(Continued)

OTHER PUBLICATIONS

Appendix P—List of IBM Patents or Patent Applications Treated as Related, Filed herewith, 2 Pages.

(Continued)

*Primary Examiner* — Vance M Little
(74) *Attorney, Agent, or Firm* — Brian M. Restauro

(57) ABSTRACT

The solutions disclosed enable security credentials to be shared between two entities. Embodiments of the present invention can be used to facilitate the transfer security credentials associated with a first level of permission of a first entity to a second entity that does not have the security credentials associated with the first level of permission in response to receiving a request to share security credentials between two entities.

20 Claims, 8 Drawing Sheets

(56) References Cited

U.S. PATENT DOCUMENTS

| | | |
|---|---|---|
| 2006/0280299 A1 | 12/2006 | Przybilla |
| 2008/0092215 A1 | 4/2008 | Soukup |
| 2008/0250244 A1 | 10/2008 | Baentsch |
| 2009/0092252 A1 | 4/2009 | Noll |
| 2010/0251360 A1 | 9/2010 | Sinclair |
| 2012/0089682 A1 | 4/2012 | Wu |
| 2013/0115915 A1* | 5/2013 | Tipton .................. H04W 12/06 455/411 |
| 2013/0227656 A1* | 8/2013 | Holtmanns ........... H04W 8/205 726/4 |
| 2013/0311773 A1 | 11/2013 | Solin |
| 2014/0026200 A1 | 1/2014 | Ekberg |
| 2014/0075523 A1* | 3/2014 | Tuomaala ........... H04W 12/003 726/6 |
| 2015/0128230 A1* | 5/2015 | Chang .................... H04L 63/08 726/5 |
| 2015/0200925 A1* | 7/2015 | Lagerstedt ...... H04W 12/04031 726/6 |
| 2017/0094509 A1 | 3/2017 | Mistry |
| 2018/0145828 A1 | 5/2018 | Coon |
| 2018/0152292 A1 | 5/2018 | Coon |

OTHER PUBLICATIONS

Li et al.; "Building a generic architecture for medical information exchange among healthcare providers"; International Journal of Medical Informatics; May 2001; pp. 241-246; vol. 61; Issues 2-3; © 2001 Elsevier Science Ireland Ltd.

Tassanaviboon; "Secure Schemes for Semi-Trusted Environment"; A thesis presented to the University of Waterloo in fulfillment of the thesis requirement for the degree of Doctor of Philosophy in Electrical and Computer Engineering; 2011; 194 pages; Waterloo, Ontario, Canada.

Wong et al.; "A Dynamic User Authentication Scheme for Wireless Sensor Networks"; Proceedings of the IEEE International Conference on Sensor Networks, Ubiquitous, and Trustworthy Computing (SUTC'06); 2006; 8 pages.

* cited by examiner

AUTHENTICATED COPYING OF ENCRYPTION KEYS BETWEEN SECURE ZONES

BACKGROUND

The present invention relates generally to encryption technology, and more specifically to transferring data from one set of integrated circuits to another set of integrated circuits.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

Smart cards are a set of embedded integrated circuits within a plastic environment and are typically the size of a conventional credit card. In some instances, these smart cards may contain a computer chip, including a microprocessor, read-only-memory (ROM), electrically erasable programmable read-only-memory (EEPROM), an Input/Output (I/O) mechanism, other circuitry to support the microprocessor in its operation, and one or more applications in the memory repository residing in the integrated circuits.

Cryptography is the practice and study of techniques for secure communication between two parties while preventing a third party from seeing the communication. Applications of cryptography include ATM cards (which are a type of smart card), computer passwords, and electronic commerce. Within the field of cryptography, a key is a piece of information (i.e., a parameter) that determines the functional output of a cryptographic algorithm. For encryption algorithms, a key specifies the transformation of plaintext into ciphertext, and vice versa for decryption algorithms. Keys also specify transformations in other cryptographic algorithms, such as digital signature schemes and message authentication codes.

SUMMARY

According to one embodiment of the present invention, a method is provided, comprising: responsive to receiving a request to share security credentials between two entities, facilitating, by one or more processors, an enrollment of respective security credentials associated with the two entities, wherein each security credential specifies a different level of permission; and transferring, by one or more processors, security credentials associated with a first level of permission of a first entity to a second entity that does not have the security credentials associated with the first level of permission.

Another embodiment of the present invention provides a computer program product, based on the method described above.

Another embodiment of the present invention provides a computer system, based on the method described above.

BRIEF DESCRIPTION OF THE DRAWINGS

One or more aspects of the present disclosed embodiments are particularly pointed out and distinctly claimed as examples in the claims at the conclusion of the specification. The foregoing and other objects, features, and advantages of the disclosed embodiments are apparent from the following detailed description taken in conjunction with the accompanying drawings in which:

DETAILED DESCRIPTION

Figure 1:
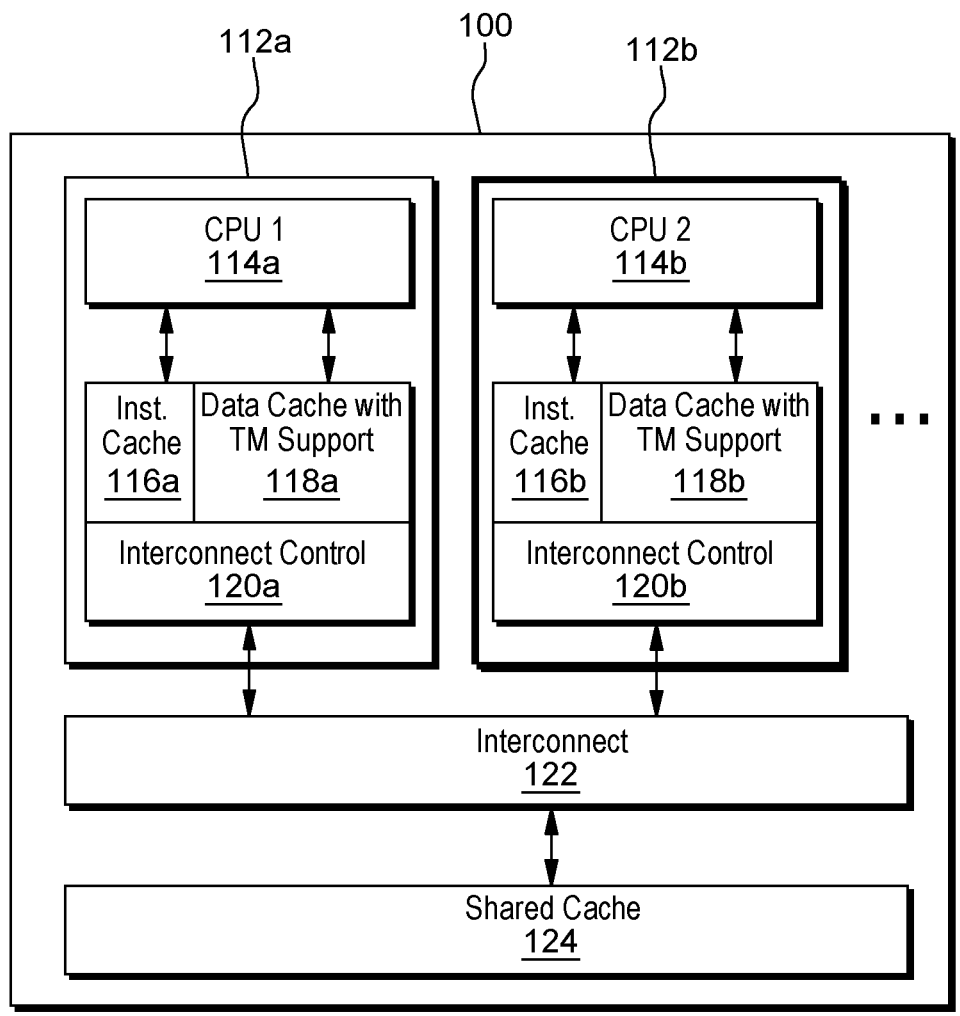
FIG. 1 and FIG. 2 depict an example multicore Transactional Memory environment, in accordance with embodiments of the present disclosure.

Ownership of a smart card is determined by two precepts: (i) a Certificate Authority (CA) whose certificate is installed on the first smart card and a different CA whose certificate is installed on the second smart card; and (ii) a personal identification number (PIN) per smart card, which permits access to the smart card. Currently, a CA establishes a zone for the secure authenticated exchange of key parts between any two entities within that zone. Those entities may be other smart cards or a cryptographic coprocessor. Embodiments of the present invention recognize that currently, keys cannot be copied from a smart card in one zone to a smart card in a different zone. In other words, embodiments of the present invention recognize that there is no way to "share" keys even with owner consent. In this manner, as discussed in greater detail later in this specification, embodiments of this invention disclose solutions for enabling keys from one smart card owned by one person to be copied to another smart card of belonging to a different owner under the guidance of the two owners. Specifically, embodiments of the present invention, enable keys to be copied from a smart card in one zone to another smart card in a different zone under dual control (i.e., both CAs are available). In other words, the keys are copied with the knowledge and permission of the owners without sacrificing the zone capability of the respective smart cards. In preferred embodiments, the data processing environment maintains encryption keys under a policy which dictates separation of duties in the secure handling of those keys.

Historically, a computer system or processor included only a single processor (aka processing unit or central processing unit). The processor typically included an instruction processing unit (IPU), a branch unit, a memory control unit, etc. Such processors were capable of executing a single thread of a program at a time. Operating systems were developed that could time-share a processor by dispatching a program to be executed on the processor for a period of time. Another program can then be dispatched to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged in a single semiconductor chip or die. Such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, and address translation mechanism. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus, the terms such as processor, central processing unit, processing unit, microprocessor, core, processor core, processor thread, and thread, for example, are often used interchangeably. Aspects of embodiments of the present invention herein may be practiced by any or all processors including those shown supra, without departing from the teachings herein. Wherein the term "thread" or "processor thread" is used herein, it is expected that particular advantage of the embodiment may be had in a processor thread implementation.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e., the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Software can observe the result of the elided lock acquire inside the critical section. Such a read operation will return the value of the write to the lock.

The processor automatically detects violations to these guidelines, and safely transitions to a non-transactional execution without elision. Since Intel™ TSX detects conflicts at the granularity of a cache line, writes to data collocated on the same cache line as the elided lock may be detected as data conflicts by other logical processors eliding the same lock. (Note: the term "Intel™ TSX" may be subject to trademark rights in various jurisdictions throughout the world and are used here only in reference to the products or services properly denominated by the marks to the extent that such trademark rights may exist.)

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition, as shown in Table 1:

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not, by itself, encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Figure 2:
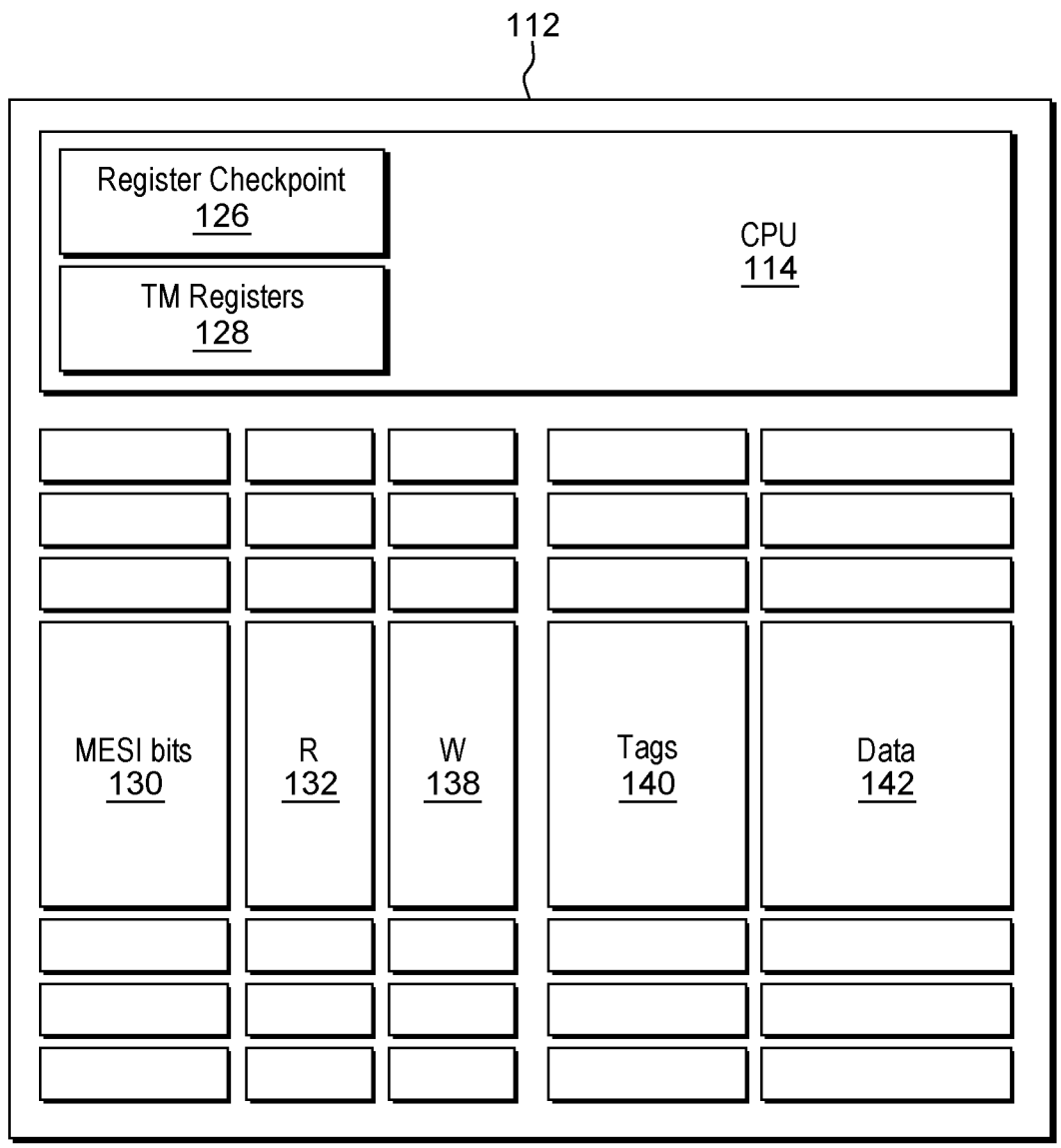

FIGS. 1 and 2 depict an example of a multicore Transactional Memory (TM) environment. For example, FIG. 1 shows many TM-enabled CPUs (CPU1 114a, CPU2 114b, etc.) on die 100, connected with interconnect 122, under management of interconnect control 120a, 120b. Each of CPU 114a, 114b (also known as a processor) may have a split cache comprising of instruction cache 116a and 116b for caching instructions from memory to be executed and data cache 118a and 118b with TM support for caching data (operands) of memory locations to be operated on by CPU 114a and 114b (in FIG. 1, each of CPU 114a and 114b and its associated caches, cache 112a, and cache 112b). In an embodiment of the present invention, caches of multiple dies are interconnected to support cache coherency between the caches of die 100. In an implementation, a single cache, rather than the split cache is employed holding both instructions and data. In implementations, the CPU caches are one level of caching in a hierarchical cache structure. For example, in instances where there are multiple dies, each die may employ shared cache 124 to be shared amongst all the CPUs on die 100. In another implementations where there are multiple dies, each die may have access to shared cache 124, shared amongst all the processors of the multiple dies.

FIG. 2 shows the details of an example transactional CPU environment 112, having transactional CPU 114, which includes additions to support TM. Transactional CPU (processor) 114 may include hardware for supporting register checkpoint 126 and special, TM registers 128. Transactional CPU is a type of cache including MESI 130, tags 140 and data 142 of a conventional cache. Transactional CPU cache can also include R 132 (which designate bits) which shows a line has been read by transactional CPU 114 while executing a transaction and W 138 (also designating bits) which shows a line has been written to by transactional CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Furthermore, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

As shown below, Table 2 illustrates the fundamental design space of transactional memory (versioning and conflict detection).

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting |

TABLE 2-continued

Transactional Memory Design Space

| | VERSIONING | |
|---|---|---|
| | Lazy | Eager |
| Pessimistic | Storing updates in a write buffer; detecting conflicts at access time. | conflicts at access time guarantees wasted work and provides no advantage Updating memory, keeping old values in undo log; detecting conflicts at access time. |

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R 132, writing a line sets its W 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read and write-sets, the number of previous aborts, etc. The combinations of measures to make such decisions are endless, but certain combinations are described below, roughly in order of increasing complexity.

In a conflict, an "attacker" and a "defender" are the nomenclature used to describe the conflicting sides. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An "Aggressive CM Policy" immediately and always retries either the attacker or the defender. In LO, "Aggressive" means that the attacker always wins, and so "Aggressive" is sometimes called "committer wins". Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. A Greedy algorithm uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132 bit, W 138 bit) may be provided for each cache line, in addition to, or encoded in the MESI coherency bits. An R 132 indicator indicates the current transaction has read from the data of the cache line, and a W 138 indicator indicates the current transaction has written to the data of the cache line.

Figure 3:
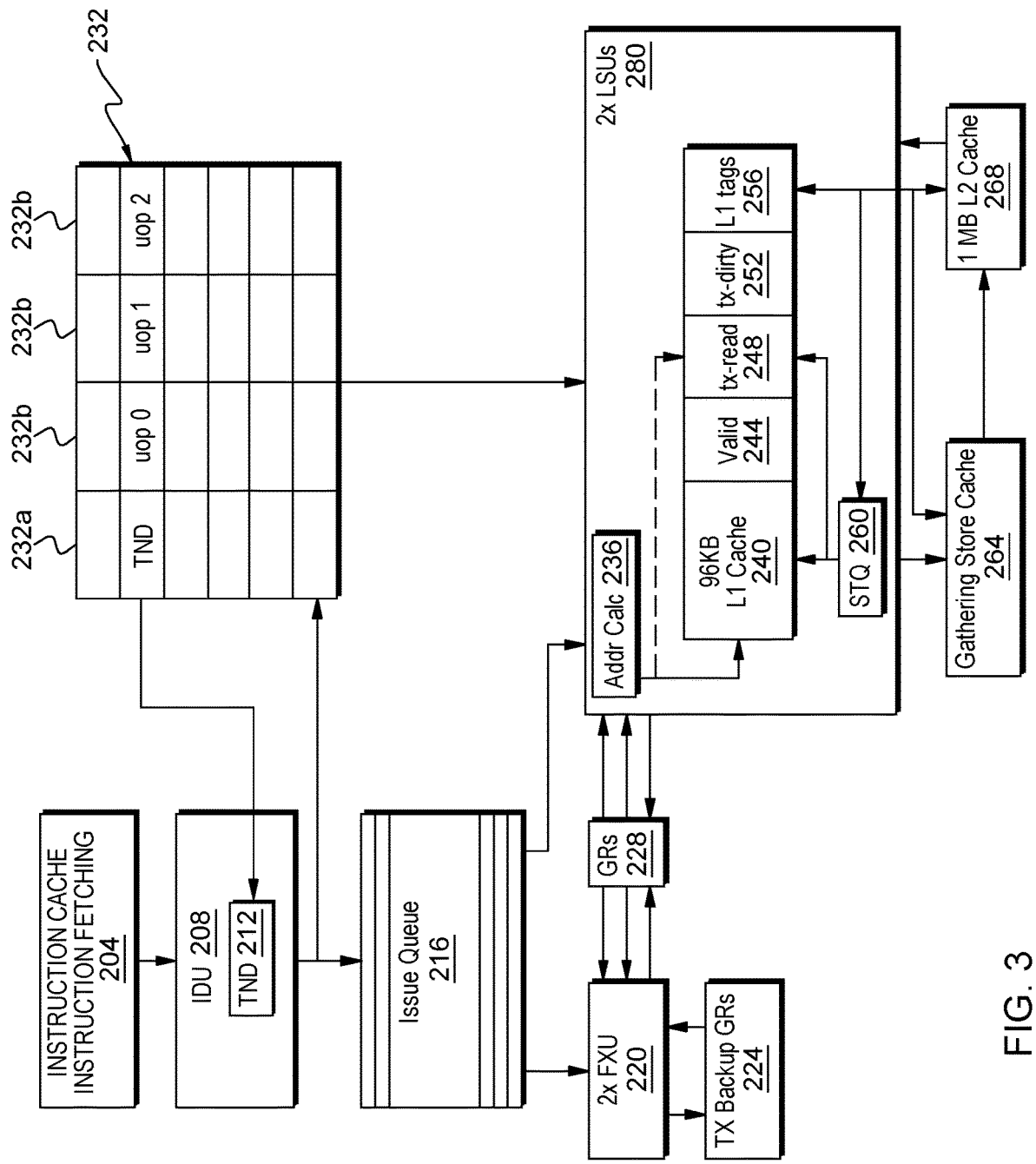
FIG. 3 depicts example components of an example CPU, in accordance with embodiments of the present disclosure.

With reference to FIG. 3, the IBM® zEnterprise EC12 processor introduced the transactional execution facility. Certain marks such as IBM® zEnterprise referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks. The processor can decode 3 instructions per clock cycle; simple instructions are dispatched as single micro-ops, and more complex instructions are cracked into multiple micro-ops. The micro-ops (Uops 232*b*) are written into a unified issue queue 216, from where they can be issued out-of-order. Up to two fixed-points, one floating-point, two load/store, and two branch instructions can execute every cycle. A Global Completion Table (GCT) 232 holds every micro-op 232*b* and a transaction nesting depth (TND) 232*a*. The GCT 232 is written in-order at decode time, tracks the execution status of each micro-op 232*b*, and completes instructions when all micro-ops 232*b* of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 (not shown), the L3 (not shown) checks whether it owns the line, and if necessary sends an XI to the currently owning L2 268/L1 240 under that L3 (not shown) to ensure coherency, before it returns the cache line to the requestor. If the request also misses the L3 (not shown), the L3 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232*b* (including, for example uop 0, uop 1, and uop2) will be executed by one of the two fixed point units (FXUs) 220 to save a pair of GRs 228 into a special transaction-backup register file 224 (also referred to as TX backup GRs 224), that is used to later restore the GR 228 content in case of a transaction abort. Also the TBEGIN spawns micro-ops 232*b* to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232*b* instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from special transaction-backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 (not shown) in the hope of finishing the transaction before the L3 (not shown) repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 is set at execution time by every load instruction that is marked "transactional" in the issue queue. Note that this can lead to over-marking if speculative loads are executed, for example on a mispredicted branch path. The alternative of setting the TX-read 248 at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1 tag 256 (also referred to as L1-directory 256) is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read 248 is active on the XI'ed line and the XI is not rejected, the LSU 280 triggers an abort. When a cache line with active TX-read 248 is LRU'ed from the L1 240, a special LRU-extension vector remembers for each of the 64 rows of the L1 240 that a TX-read line existed on that row. Since no precise address tracking exists for the LRU extensions, any non-rejected XI hits a valid extension row such that the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 bit cache line is LRU'ed from the L1 240.

Store Cache

In prior systems, since the L1 240 and L2 268 are store-through caches, every store instruction causes an L3 (not shown) store access; with now 6 cores per L3 (not shown) and further improved performance of each core, the store rate for the L3 (and to a lesser extent for the L2 268) becomes problematic for certain workloads. In order to avoid store queuing delays, a gathering store cache 264 had to be added, that combines stores to neighboring addresses before sending them to the L3 (not shown).

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 (not shown)).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 (not shown) caches.

When a new outermost transaction begins, all existing entries in the store cache are marked closed so that no new stores can be gathered into them, and eviction of those entries to L2 268 and L3 (not shown) is started. From that point on, the transactional stores coming out of the LSU 280 STQ 260 allocate new entries, or gather into existing transactional entries. The write-back of those stores into L2 268 and L3 (not shown) is blocked, until the transaction ends successfully; at that point subsequent (post-transaction) stores can continue to gather into existing entries, until the next transaction closes those entries again.

The store cache 264 (also referred to as gathering store cache 264) is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction— those doublewords stay valid across transaction aborts.

Millicode-Implemented Functions

Traditionally, certain mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

CPU 114 (as shown in FIG. 2) supports a special millicode-only instruction to read out the transaction-backup register file 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR of GRs 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more of the capabilities of the present invention can be implemented in software, firmware, hardware, or some combination thereof. Further, one or more of the capabilities can be emulated.

Figure 4:
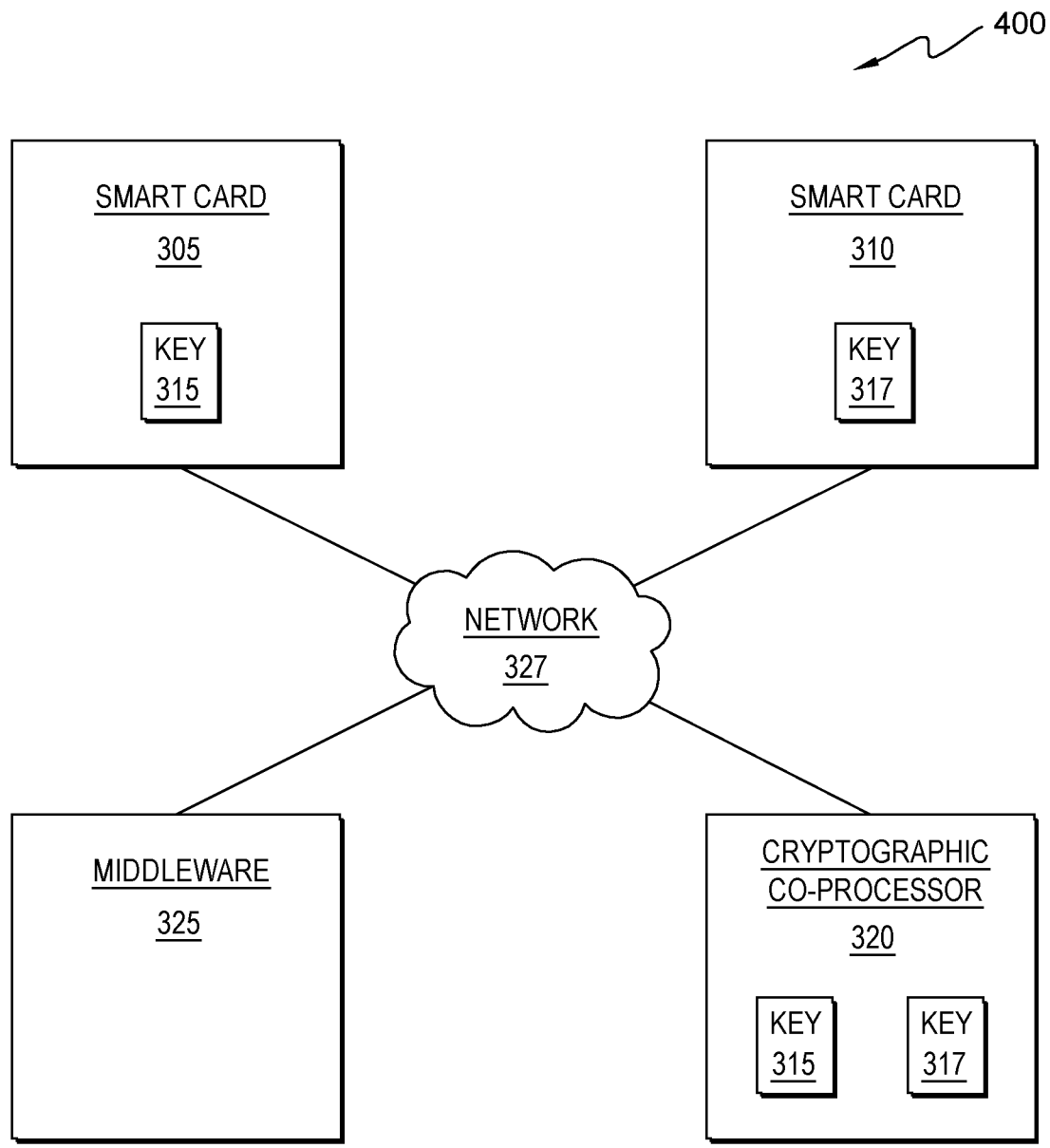
FIG. 4 depicts a data processing environment for cryptographic operations, in accordance with the embodiments of the present disclosure.

FIG. 4 depicts a data processing environment 400 for cryptographic operations, in accordance with the embodiments of the present disclosure.

Environment 400 contains: (i) smart card 305; (ii) smart card 310; (iii) cryptographic co-processor 320; and (iv) middleware 325 connected by network 327. Network 327 may be any combination of devices or setups which enable communication between cryptographic co-processor 320 and other components—smart card 305, smart card 310, and middleware 325. Direct communications via non-transitory signals exist between: smart card 305 and cryptographic co-processor 320; smart card 310 and cryptographic co-processor 320; middleware 325; and cryptographic co-processor 320.

Smart card 305 and smart card 310 are a set of embedded integrated circuits within a plastic environment and are typically the size of a conventional credit card. Furthermore, smart cards 305 and 310 may be either contact or contactless smart card. Smart cards may provide personal identification, authentication, data storage, application processing, and strong security authentication for single sign-on (SSO) within large organizations.

Smart card 305 and smart card 310 each contain security credentials in which a certificate authority (CA) has been issued. In this embodiment, a security credential can grant access to certain zones or areas of clearance. A security credential can also include information specific to users and may further include tokens which identifies a specific key-encrypting key unique to the smart card that encrypts the security credentials of that smart card. In this embodiment, a security credential is denoted by "keys". For example, smart card 305 includes key 315 while smart card 310 includes key 317. In other embodiments, a security credential may allow access to restricted files and/or give permission for the security card bearing the security credentials to be logged in at one or multiple sites.

For the purposes of this discussion, key 315 includes security credentials for a particular zone, Zone A (not shown) while key 317 includes security credentials for Zone B (not shown). Key 315 and key 317 can be a symmetric key (AES, DES) or an asymmetric key (RSA, ECC). A symmetric key derived by Diffie-Hellman key exchange is used to encrypt: (i) key 315 to grant access to Zone A; and (ii) key 317 to grant access to Zone B via cryptographic co-processor 320 and middleware 325.

Key 315 grants smart card 305 access to Zone A and Key 317 grants smart card 310 access to Zone B. Smart card 305 and smart card 310 are examples of a secure paradigm in which a CA has issued (i.e., generated and signed) certificates to each entity associated a particular zone. In this embodiment, the entities are smart card 305, smart card 310, and cryptographic co-processor 320.

In this embodiment, different zones reflect different areas of clearances. For example, Zones A and B can be created in order to enable the secure exchange of an encryption key by entities within a particular zone or area of clearance to grant the holder of the security credentials access to the respective zone. In this embodiment, security credentials for Zone A and Zone B are established by installing an entity certificate issued and signed by the respective zone CA along with the self-signed certificate of the CA.

Key 315 designates security credentials that grant smart card 305 access to Zone A. These security credentials can only be verified by a cryptographic co-processor that has a corresponding certificate authority that recognizes the security credentials of key 315. Conversely, key 317 designates security credentials that grant smart card 310 access to Zone B which can only be verified by a corresponding certificate authority that recognizes the security credentials of key 317. The corresponding certificate authority recognizes the respective security credentials for keys 315 and 317 separately, that is, the corresponding certificate authority can only recognize the security clearances pre-loaded onto the respective smart cards.

In this embodiment, security credentials, (e.g., key 315) may then be moved between the entities that have certificate authorities that grant access to Zone A by storing those security credentials in a temporary file on middleware 325. Security credentials can then be transferred to a different entity (e.g., smart card 310) after the entity makes contact with cryptographic co-processor 320. In this embodiment, security credentials are transferred to a different entity by recognizing the entity given clearance (e.g., smart card 310) and loading the security credentials (e.g., the temporary file of key 315) stored in middleware 325 to the entity as discussed in greater detail with regard to FIG. 5. For example, key 315 is stored in the temporary file on middleware 325. Security credentials of smart card 310 is then read by middleware 325 and input to the cryptographic co-processor (e.g., cryptographic co-processor 320) to be decrypted and re-encrypted using a key-encrypting key to establish the security credentials given by key 317.

In this embodiment, security credentials can be transferred to give temporary access for a configurable period of time. For example, security credentials specified by key 315 can be transferred for a period of twenty-four hours (e.g., for a contractor of a company hired to fix a problem). In instances where security credentials from one smart card is transferred to a different smart card (e.g., from smart card 305 to smart card 310), the security credentials of the different smart card (e.g., smart card 310) are not erased. In other words, the security credentials of the different smart card (e.g., smart card 310) are not revoked or over-written but granted additional security credentials. In other embodiments, security credentials can be transferred to give permanent access.

Smart cards 305 and 310 can further include the following information: (i) a smart card type (e.g., Certificate Authority (CA), non-CA); (ii) a smart card identification, which is a 9-digit identifier generated upon initializing a smart card; (iii) a PIN; (vi) a zone a zone identification, which is a 8-digit identifier of the zone of the CA which initialized the smart card; and (vii) zone key, which is the public key modulus of the CA.

Cryptographic co-processor 320 is a hardware module which includes a processor to perform encryption functions. Through built-in protection features, cryptographic co-processor 320 prevents unauthorized retrieval of data. Cryptographic co-processor 320 may provide only encryption or include certain transaction processing. For example, a variant of cryptographic co-processor 320, which behaves as a smart card coprocessor, includes functions as performed by smart card 305 and smart card 310 in order to house smart card 305 and smart card 310 in the same protective environment as the encryption algorithm. Furthermore, an encryption key within a smart card type entity (i.e., smart card 305 or smart 310) is exchanged to cryptographic co-processor 320 within the same zone. For example, security credentials that grant access to Zone A of cryptographic co-processor 320 can exchange key 315 only from the security credentials of smart card 305 or via a transfer of security credentials that grant access to Zone A of smart card 310.

Middleware 325 is a computer software program which provides services to software applications beyond those available from the operating system. Middleware 325 permits software developers to implement communication and input/output functions in order focus on the specific purpose of a software application. Middleware 325 may include web servers, application servers, content management systems, and similar tools that support application development and delivery. If the CAs that specifies access for the different zones are present in the smart cards and PIN protection on the smart cards is active at the time of the exchange, middleware 325 allows the exchange of security credentials (e.g., key 315) between entities (e.g., smart card 305, smart card 310, and cryptographic co-processor 320) that gives access to different zones (e.g., Zone A and Zone B). For illustrative purposes, middleware 325 is depicted as a stand-alone, separate entity from cryptographic co-processor 320. However, it should be understood that middleware 325 can be embedded within cryptographic co-processor 320 as a part of a cryptographic processing system.

Network 327 can be, for example, a local area network (LAN), a wide area network (WAN) such as the Internet, or a combination of the two, and include wired, wireless, or fiber optic connections. In general, network 327 can be any combination of connections and protocols that will support communications between smart card 305, smart card 310, middleware 325 and cryptographic co-processor 320, in accordance with a desired embodiment of the invention.

Figure 5:
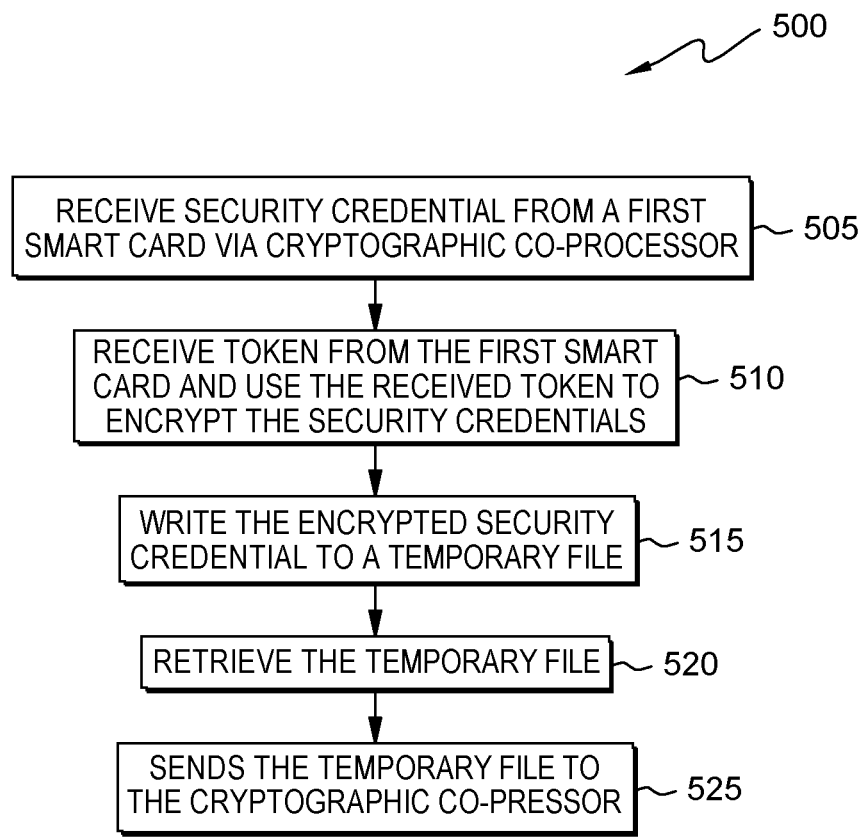
FIG. 5 is a flowchart for sharing security credentials, in accordance with the embodiments of the present disclosure.

FIG. 5 is a flowchart 500 for sharing security credentials, in accordance with the embodiments of the present disclosure.

In step 505, middleware 325 receives the security credentials from a first smart card via cryptographic coprocessor. In this embodiment, the security credentials are keys associated with the smart card. For example, key 315 is exchanged securely between smart card 305 and cryptographic co-processor 320 which have respective security protocols that recognize that clearance for the same zone (e.g., Zone A) using current methods as understood in the art. Accordingly, cryptographic co-processor 320 can decrypt or encrypt the security credentials of key 315 and then subsequently send the encrypted security credentials to middleware 325. In this embodiment, middleware 325 receives the security credentials from the first smart card from cryptographic co-processor. Key 315 is subsequently received by middleware 325 from cryptographic co-processor 320 as an encrypted variant through a key-encrypting key.

In step 510, middleware 325 receives a token from the first smart card. In this embodiment, middleware 325 receives a token from the smart card via cryptographic co-processor 320. In this embodiment, middleware 325 uses the received token to encrypt the decrypted security credentials (e.g., to encrypt key 315) which yield an encrypted key variant of key 315. In other words, the token, which identifies the key-encrypting key, is also received by middleware 325.

In step 515, middleware 325 writes the encrypted security credential to a temporary file. The encrypted security credential is the encrypted variant of key 315. Middleware 325 facilitates the successful enrollment of the target zone in a second entity, wherein the target zone is different from the zone in the first entity as described in step 505. The CA of the target zone (i.e., the security credentials of smart card 310 that specifies access to zone B) is then used to enroll the cryptographic coprocessor in the target zone.

In step 520, middleware 325 retrieves the temporary file. The temporary file (e.g., temporary file 330 as shown and described in FIG. 6B) contains the encrypted security credentials and the token associated with the key-encrypting key. In this embodiment, middleware 325 retrieves the temporary file in response to a notification from cryptographic co-processor 320. In this embodiment, the notification from cryptographic coprocessor 320 can be a request from a smart card that has been designated the recipient of the security credentials contained in the temporary file. The token of the key-encrypting key is also retrieved with the temporary file.

In step 525, middleware 325 sends the temporary file to the cryptographic co-processor. The encrypted variant of key 315 is decrypted inside of cryptographic co-processor 320, which in turn sets up a secure session between cryptographic coprocessor 320 and the second entity (i.e., smart card 310) in the target zone (i.e., Zone B) using currently available methods known in the art. Key 315 is again encrypted under a session key (i.e., a transitory key-encrypting-key) established between the two entities (i.e., cryptographic co-processor 320 and smart card 310) and sent to the second smart card for secure storage. Thus, the objective of copying/moving key 315 from one zone to another zone has been accomplished.

Figure 7:
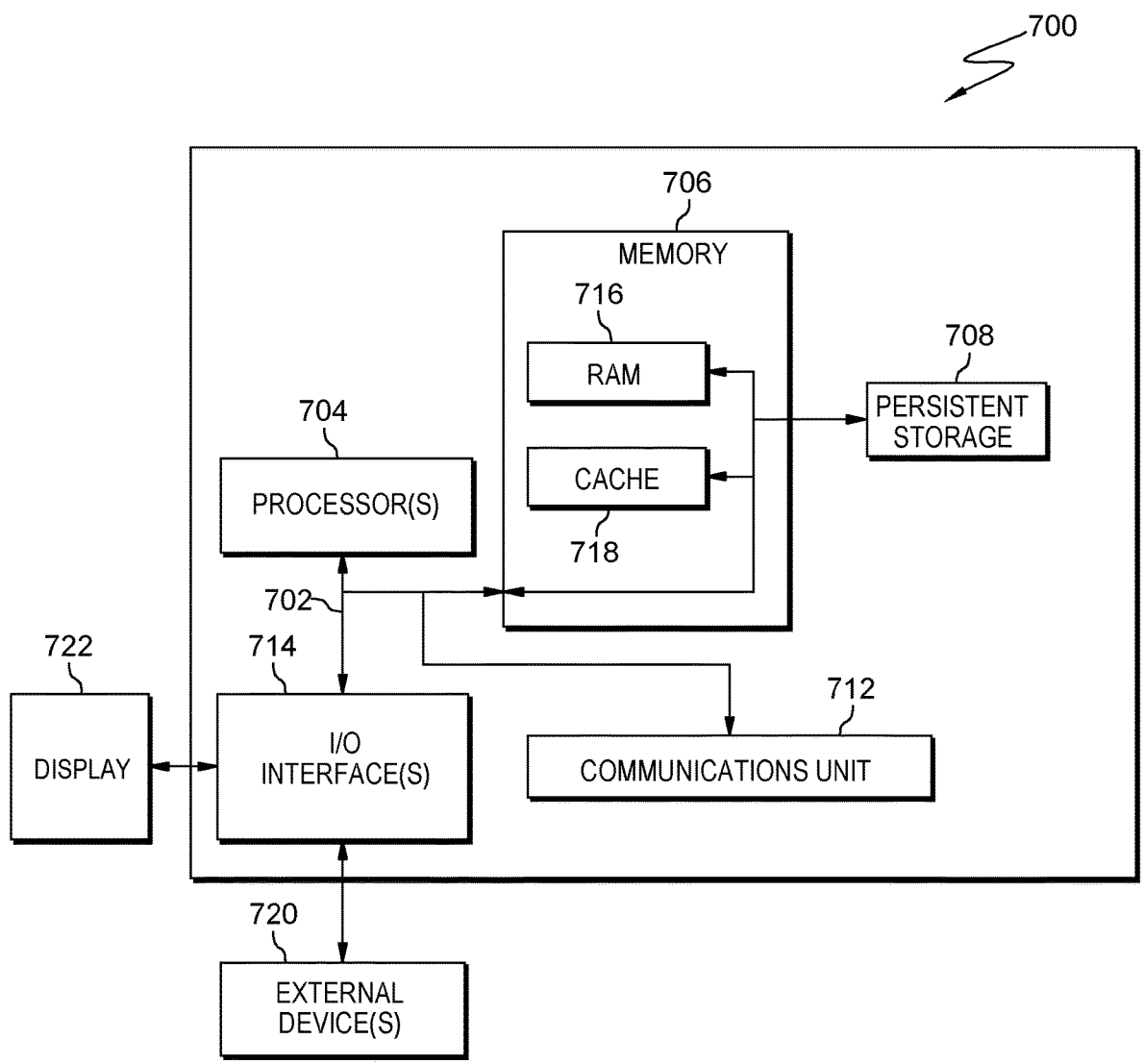
FIG. 7 is a block diagram of internal and external components of a computing device, in accordance with the embodiments of the present disclosure.

One or more aspects of the present invention can be included in an article of manufacture (e.g., one or more computer program products) having, for instance, computer readable storage media as depicted in FIG. 7. The media has embodied therein, for instance, computer readable program code (instructions) to provide and facilitate the capabilities of the present invention. The article of manufacture can be included as a part of a computer system or as a separate product.

Figure 6A:
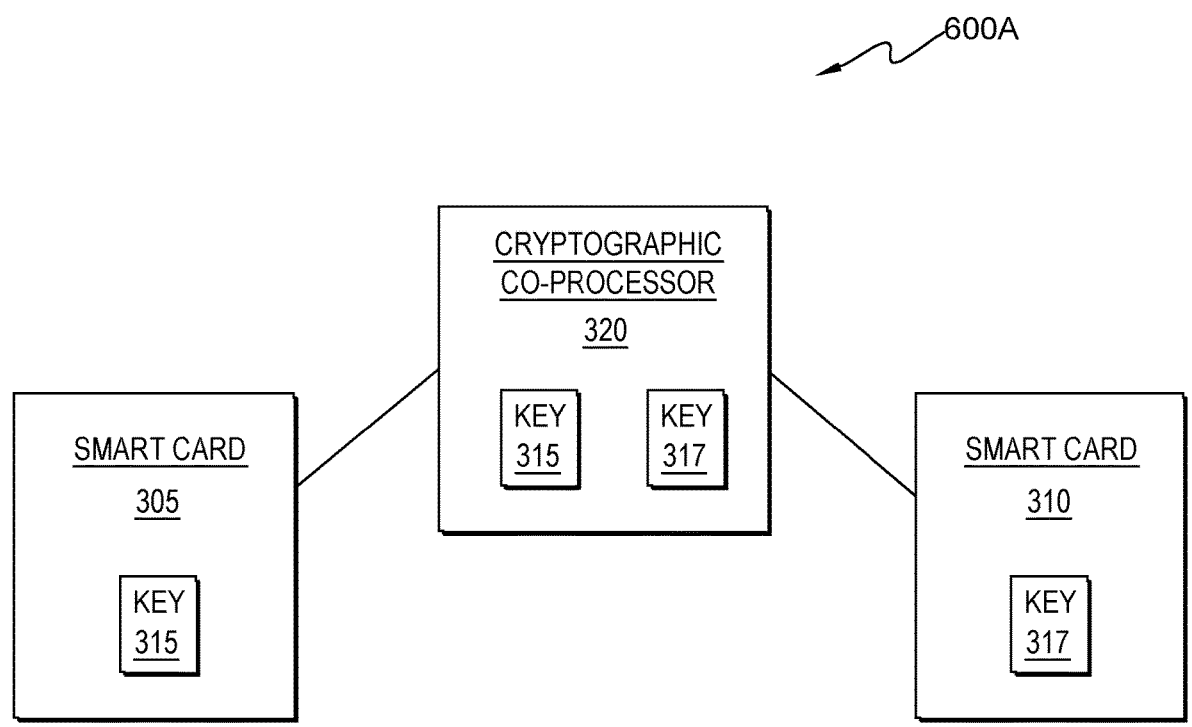
FIG. 6A depicts an example transaction, in accordance with the embodiments of the present disclosure.

FIG. 6A depicts an example transaction 600A, in accordance with the embodiments of the present disclosure.

Example transaction 600A includes two smart cards, smart card 305 and smart card 310. In this example, smart card 305 has security credentials specified by key 315. Specifically, smart card 305 has security credentials which give access to Zone A, (not shown). In contrast, smart card 310 has security credentials specified by key 317. In this example, smart card 310 has security credentials which give access to Zone B. Cryptographic co-processor 320 has corresponding keys that recognize the security credentials by each respective smart card (e.g., smart card 305 and smart card 310) and the different zones each respective card is authorized access.

In this specific instance, a user of smart card 305 has established a connection with cryptographic co-processor 320 to gain access to Zone B. However, the security credentials loaded on smart card 305 does not authorize the user of smart card 305 access to Zone B. Conversely, the user of smart card 310, which has security credentials for Zone B cannot access Zone A. Furthermore, the user of smart card 305 has agreed to give the user of smart card 310 access to Zone A but is unable to without the use of middleware 325 (not shown).

Figure 6B:
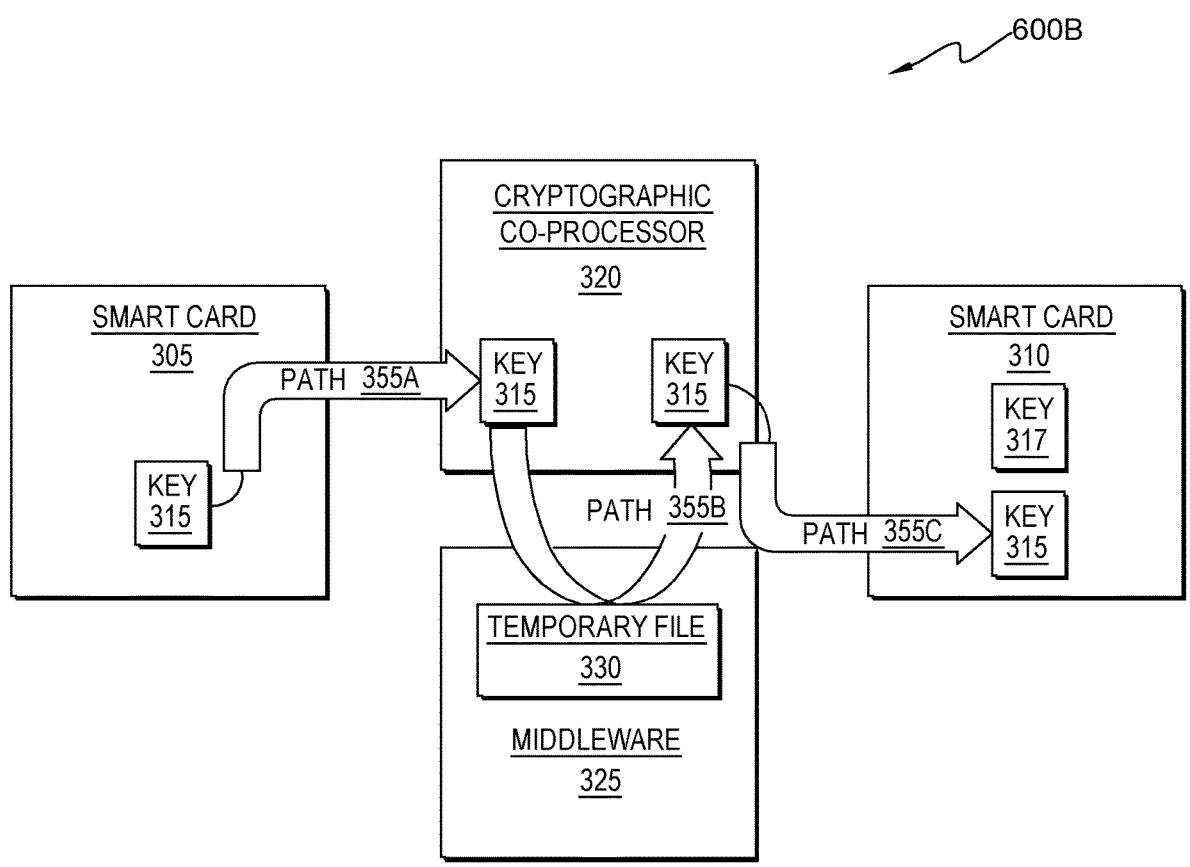
FIG. 6B depicts a completed example transaction, in accordance with the embodiments of the present disclosure.

FIG. 6B depicts a completed example transaction 600B, in accordance with the embodiments of the present disclosure.

Example transaction 600B includes: (i) smart card 305; (ii) smart card 310; (iii) cryptographic co-processor 320; and (iv) middleware 325.

Path 355A, path 355B, and path 355C represent non-transitory media/signals or other means of transferring data/information. Path 355A, path 355B, and path 355C work in concert with each other to construct an unobstructed pathway to facilitate the sharing of security credentials. When path 355 is not operable, encryption keys cannot be exchanged with entities in different zones in order to provide a security measure to protect the encryption keys. In other words, key 315 within zone A of the entity smart card 305 cannot exchange with: (i) Zone B of the entity smart card 310; or (ii) Zone B of the entity cryptographic co-processor 320. Furthermore, the CA is present for Zone A and Zone B, wherein an enrolled unit of Zone A resides in smart card 305 and cryptographic co-processor 320; and an enrolled unit of Zone B resides smart card 310, and cryptographic co-processor 320.

In this example, the user of smart card 305 has chosen to share security credentials with the user of smart card 310. Continuing this example, smart card 305 has established a connection with cryptographic co-processor 320. The security credentials of smart card 305 are shared to smart card 310 through path 355 by using the systems and methods as enabled by middleware 325. In this instance, middleware 325 has securely copied the security credentials specified by key 315 into temporary file 330.

To facilitate the secure transfer, the user of smart card 310 establishes a connection with cryptographic co-processor 320. In response to cryptographic-coprocessor 320 establishing a connection with smart card 310, middleware 325 has "pushed" the copy of security credentials specified by key 315 via path 355B to cryptographic co-processor 320. Accordingly, cryptographic co-processor 320 can transmit the copy of the security credentials specified by key 315 to smart card 310 via path 355C.

Accordingly, smart card 310 has been given added security credentials of key 315 temporarily in addition to the security credentials of key 317.

FIG. 7 is a block diagram of internal and external components of a computer system 700, which is representative of the computer systems of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer-readable storage medium that is also part of persistent storage 708.

Communications unit 712 provides for communications with other computer systems or devices via a network (e.g., network 327). In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720 such as a keyboard, computer mouse, touch screen, virtual keyboard, touch pad, pointing device, or other human interface devices. External devices 720 can also include portable computer-readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    transferring, by one or more processors, security credentials stored on a smart key card associated with a first entity having a first subset level of permission that allows the first entity access to a first zone to a smart key card of a second entity that does not have the security credentials associated with the first subset level of permission for a specified time period and purpose while maintaining security credentials of the second entity that are already stored on the smart key card of the second entity and maintaining the security credentials of the first entity on the smart key card of the first entity by:
        creating a temporary file based on security credentials of the first entity and transferring the temporary file that includes the security credentials of the first entity.

2. The computer-implemented method of claim 1, further comprising:
   responsive to receiving a request to share security credentials between two entities, enrolling, by one or more processors, respective security credentials associated with a first and a second entity, wherein each security credential specifies different levels of permission for the first and the second entity.

3. The computer-implemented method of claim 1, wherein enrolling, by one or more processors, respective security credentials associated with the two entities, wherein each security credential specifies a different level of permission comprises:
   receiving, by one or more processors, a token, wherein the token identifies a key-encrypting-key used to encrypt the data associated with a first subset level of permission of accessing a first zone;
   decrypting, by one or more processors, the data associated with the first subset level of permission; and
   encrypting, by one or more processors, the data associated with the first subset level of permission using the identified key-encrypting-key.

4. The computer-implemented method of claim 3, further comprising:
   writing, by one or more processors, the encrypted data to a temporary file.

5. The computer-implemented method of claim 4, further comprising:
   establishing, by one or more processors, a secure connection between the first entity having security credentials associated with the first subset level of permission and the second entity that does not have the security credentials associated with the first subset level of permission.

6. The computer-implemented method of claim 5, further comprising:
   retrieving, by one or more processors, the encrypted data from the temporary file and the token associated with a key-encrypting-key associated with the first subset level of permission; and
   sending, by one or more processors, the encrypted data to the second entity.

7. The computer-implemented method of claim 6, further comprising:
   responsive to decrypting the encrypted data, enabling, by one or more processors, temporary access to the security credentials associated with the first subset level of permission.

8. A computer program product comprising:
   a computer readable storage medium and program instructions stored on the computer readable storage medium, the program instructions comprising:
   program instructions to transfer security credentials stored on a smart key card associated with a first entity having a first subset level of permission that allows the first entity access to a first zone to a smart key card of a second entity that does not have the security credentials associated with the first subset level of permission by
   creating a temporary file based on security credentials of the first entity and transferring the temporary file that includes the security credentials of the first entity, wherein the temporary file includes instructions to persist for a specified time period and purpose while maintaining security credentials of the second entity that are already stored on the smart key card of the second entity and maintaining the security credentials of the first entity on the smart key card of the first entity.

9. The computer program product of claim 8, wherein the program instructions stored on the one or more computer readable storage medium further comprise:
   program instructions to, responsive to receiving a request to share security credentials between two entities, enroll respective security credentials associated with a first and a second entity, wherein each security credential specifies different levels of permission for the first and the second entity.

10. The computer program product of claim 8, wherein the program instructions to enroll respective security credentials associated with the two entities, wherein each security credential specifies a different level of permission comprise:
    program instructions to receive token, wherein the token identifies a key-encrypting-key used to encrypt the data associated with a first subset level of permission of accessing a first zone;
    program instructions to decrypt the data associated with the first subset level of permission; and
    program instructions to encrypt the data associated with the first subset level of permission using the identified key-encrypting-key.

11. The computer program product of claim 10, wherein the program instructions stored on the one or more computer readable storage medium further comprise:
    program instructions to write the encrypted data to a temporary file.

12. The computer program product of claim 11, wherein the program instructions stored on the one or more computer readable storage medium further comprise:
    program instructions to establish a secure connection between the first entity having security credentials associated with the first subset level of permission and the second entity that does not have the security credentials associated with the first subset level of permission.

13. The computer program product of claim 12, wherein the program instructions stored on the one or more computer readable storage medium further comprise:
    program instructions to retrieve the encrypted data from the temporary file and the token associated with a key-encrypting-key associated with the first subset level of permission; and
    program instructions to send the encrypted data to the second entity.

14. The computer program product of claim 13, wherein the program instructions stored on the one or more computer readable storage medium further comprise:
    program instructions to, responsive to decrypting the encrypted data, enable temporary access to the security credentials associated with the first subset level of permission.

15. A computer system, comprising:
    one or more computer processors;
    one or more computer readable storage media;
    program instructions stored on the one or more computer readable storage media for execution by at least one of the one or more processors, the program instructions comprising:
    program instructions to transfer security credentials stored on a smart key card associated with a first entity having a first subset level of permission that allows the first entity access to a first zone to a smart key card of a second entity that does not have the security credentials associated with the first subset level of permission by creating a temporary file based on security credentials of the first entity and transferring the temporary file that includes the security credentials of the first entity, wherein the temporary file includes instructions to persist for a specified time period and purpose while maintaining security credentials of the second entity that are already stored on the smart key card of the second entity and maintaining the security credentials of the first entity on the smart key card of the first entity.

16. The computer system of claim 15, wherein the program instructions stored on the one or more computer readable storage medium further comprise:

program instructions to, responsive to receiving a request to share security credentials between two entities, enroll respective security credentials associated with a first and a second entity, wherein each security credential specifies different levels of permission for the first and the second entity.

17. The computer system of claim 15, wherein the program instructions to enroll respective security credentials associated with the two entities, wherein each security credential specifies a different level of permission comprise:

program instructions to receive token, wherein the token identifies a key-encrypting-key used to encrypt the data associated with a first subset level of permission of accessing a first zone;

program instructions to decrypt the data associated with the first subset level of permission; and program instructions to encrypt the data associated with the first subset level of permission using the identified key-encrypting-key.

18. The computer system of claim 17, wherein the program instructions stored on the one or more computer readable storage medium further comprise:

program instructions to write the encrypted data to a temporary file.

19. The computer system of claim 18, wherein the program instructions stored on the one or more computer readable storage medium further comprise:

program instructions to establish a secure connection between the first entity having security credentials associated with the first subset level of permission and the second entity that does not have the security credentials associated with the first subset level of permission.

20. The computer system of claim 19, wherein the program instructions stored on the one or more computer readable storage medium further comprise:

program instructions to retrieve the encrypted data from the temporary file and the token associated with a key-encrypting-key associated with the first subset level of permission; and program instructions to send the encrypted data to the second entity.

* * * * *